Patented Jan. 27, 1942

2,271,276

UNITED STATES PATENT OFFICE 2,271,276

PROCESS FOR PRODUCING CEMENT

Ole Rolfsen, Oslo, Norway

No Drawing. Application February 15, 1937, Serial No. 125,933. In Norway February 26, 1936

3 Claims. (Cl. 106—100)

In the ordinary production of cement a raw material, which in the case of Portland cement comprises a mixture of carbonate of lime, silica and a certain amount of sesqui-oxides, is burnt in a rotation furnace, a shaft furnace or a sintering apparatus, whereby there is obtained a clinker which contains besides trisilicate of lime as its main component also disilicate of lime and oxides of calcium-aluminum and calcium-aluminum-iron.

As an example of an ordinary production of cement there may be mentioned a raw material of the following composition:

| | Parts (about) |
|---|---|
| $CaCO_3$ | 120 |
| $SiO_2$ | 22 |
| $R_2O_3$ | 8 | where $R_2O_3$ indicates the sesqui-oxides.

By burning this raw material in a known manner there is obtained a Portland cement with substantially the following composition:

| | Per cent (about) |
|---|---|
| $3CaO.SiO_2$ | 55 |
| $2CaO.SiO_2$ | 15–20 |
| $3CaO.Al_2O_3$ | 10–15 |
| $4CaO.Al_2O_3Fe_2O_3$ | 6–8 |

A difficulty which is met with by the production of cement in accordance with the known methods, consists in obtaining sufficient time for the burning as the process will in many cases develop so slowly that the time is not sufficient as well for the dissociation of the carbon dioxide of the lime stone as for the formation of the various clinker minerals.

In different processes it has been tried to overcome this difficulty in various manners for instance in the sintering process by adding large amounts of return materials to the mixture which is to be sintered.

In spite of this considerable ignition losses due to insufficient formation of clinker minerals have proved unavoidable in the ordinary methods for production of cement.

The present invention has for its object an improved method for the production of cement, in which the difficulties in obtaining a complete dissociation and the highest possible formation of clinker minerals with accompanying reduction of ignition losses are avoided, whereas at the same time it is possible by using the present invention, to obtain either a product the properties of which are more or less equivalent with the properties of granulated blast furnace slag and which may be used accordingly as slag cement after being mixed with Portland cement, or on the other hand a very hard-burnt Portland cement clinker by means of a process which may be carried out in a shorter time and with less ignition losses than is the case in the ordinary processes for the production of cement.

In accordance with the present invention the production of cement is carried out in two steps, the first step consisting in burning at a comparatively low temperature (up to about 1200° C.) and without preliminary grinding a charge which contains only a part of the amount of lime necessary for the cement, and which may or may not comprise the amount of sesqui-oxides necessary for the final product. By the treatment of this charge at the comparatively low temperature indicated there is obtained a product containing silicates of lime, mainly disilicate of lime.

In case the burning has taken place without the addition of sequi-oxides the disilicate of lime is obtained in the form of an unstable product ($\beta$ crystals) which by cooling is caused to crumble or disintegrate in the form of $\gamma$ crystals. In case the raw material has contained the usual amount of sequi-oxides and in some cases a certain amount of MgO, there is obtained a stable product which by cooling is transferred into a form approximately equivalent to granulated blast furnace slag and which may be used as addition to Portland cement in the same manner as blast furnace slag.

In case the treatment during the first step here indicated takes place without the addition of sesqui-oxides, the product after crumbling is mixed with further amounts of carbonate of lime and sesqui-oxides, whereupon during the second step of the process it is exposed to renewed burning, whereby ordinary Portland cement clinker is obtained.

As examples of the carrying out of the present process may be mentioned:

(a) First step: A raw material comprising approximately 75–80 parts $CaCO_3$ and about 22 parts $SiO_2$ is burnt at a temperature of up to 1200° C. during a period of about 10 minutes.

There is obtained a disilicate of lime in the form of $\beta$ crystals which crumbles under transformation into $\gamma$ crystals. This product is then mixed with further 40 parts $CaCO_3$ and 8 parts $R_2O_3$, whereupon it is reburnt during the second step of the process at a temperature of 1400–1500° C. during a period of about 10 minutes. As final product there is obtained a very hard-burnt clinker with a minimum of ignition losses. The total time for the two burning processes is shorter than the necessary time for burning an ordinary Portland cement of the normal raw material by means of the known methods.

(b) A raw material comprising approximately 75–80 parts $CaCO_3$, about 22 parts $SiO_2$ and about 8 parts $R_2O_3$ with or without an amount of MgO is burnt at a temperature of up to about 1200° C. during a period of about 10 minutes, and is then rapidly cooled. There is obtained a partly granulated product which is approximately equivalent to granulated blast furnace slag and which may be used accordingly.

The present method may be utilised as well in connection with the production of cement in rotating or shaft furnace as in the production of cement in accordance with the draft sintering method.

In the latter case the first step of the process may be carried out in a sintering pan which is connected in the current of air behind another sintering pan in which the burning during the second step of the process is taking place, the heat transferred from the last named pan with or without the heat from a combustible placed on or mixed with the material of the lower pan being sufficient to carry out the first step of the process.

Obviously the present method may also be used for the production of alumina cements, in which case part of the lime is added to the bauxite for carrying out the first step, the resulting product being ground and reburnt together with the rest of the lime stone, so as to obtain clinker, which is then ground in the ordinary manner.

I claim:

1. The process for the production of a normal cement which contains $3CaO.SiO_2$ as the predominant ingredient, comprising burning at a temperature of substantially 1200° C. a lime silica charge which contains only part of the lime necessary for the final product and wherein the $CaO:SiO_2$ ratio is not substantially above 65:35 whereby a product which is not a normal cement but which consists predominantly of $2CaO.SiO_2$ in the form of $\beta$ crystals results, then cooling the said product whereby conversion to $\gamma$ crystal form with simultaneous disintegration results, admixing the resultant product with the additional lime required for a normal cement, grinding the admixture, reburning the latter at a temperature of up to about 1400–1500° C., and finally grinding the resultant product whereby a normal cement results.

2. The process for the production of a normal cement which contains $3CaO.SiO_2$ as the predominant ingredient, comprising burning at a temperature of substantially 1200° C. a charge containing substantially only limestone and silica and comprising less calcium carbonate with relation to the silica than the amount necessary for the formation of the final product, the $CaO:SiO_2$ ratio in said charge being not substantially above 65:35, whereby a product which is not a normal cement but which consists predominantly of $2CaO.SiO_2$ in the form of $\beta$ crystals results, then cooling the said product whereby conversion to $\gamma$ crystal form with simultaneous disintegration results, admixing the resultant product with the additional lime required for a normal cement, grinding the admixture, reburning the latter at a temperature of up to about 1400–1500° C., and finally grinding the resultant product whereby a normal cement results.

3. The process for the production of a normal cement which contains $3CaO.SiO_2$ as the predominant ingredient, comprising burning at a temperature of substantially 1200° C. a charge containing limestone, silica and the sesquioxides of aluminum ($Al_2O_3$) and iron ($Fe_2O_3$) and comprising less calcium carbonate with relation to the silica than the amount necessary for the formation of the final product, the $CaO:SiO_2$ ratio in said charge being not substantially above 65:35, whereby a product which is not a normal cement but which consists predominantly of $2CaO.SiO_2$ in the form of $\beta$ crystals results, then cooling the said product whereby conversion to $\gamma$ crystal form with simultaneous disintegration results, admixing the resultant product with additional lime and sesquioxides of aluminum and iron in the amount required for a normal cement, grinding the admixture, reburning the latter at a temperature of up to about 1400–1500° C., and finally grinding the resultant product whereby a normal cement results.

OLE ROLFSEN.